Jan. 16, 1923.

J. C. LINDNER.
ELECTRIC INTERLOCKING SYSTEM.
FILED FEB. 15, 1919.

INVENTOR
John C. Lindner,
BY
Neil H. Preston
ATTORNEY

Jan. 16, 1923.

J. C. LINDNER.
ELECTRIC INTERLOCKING SYSTEM.
FILED FEB. 15, 1919.

INVENTOR
John C. Lindner,
BY
Neil D. Preston.
ATTORNEY

Patented Jan. 16, 1923.

1,442,688

UNITED STATES PATENT OFFICE.

JOHN C. LINDNER, OF ROCHESTER, NEW YORK, ASSIGNOR TO GENERAL RAILWAY SIGNAL COMPANY, OF ROCHESTER, NEW YORK, A CORPORATION OF NEW YORK.

ELECTRIC INTERLOCKING SYSTEM.

Application filed February 15, 1919. Serial No. 277,267.

*To all whom it may concern:*

Be it known that I, JOHN C. LINDNER, a citizen of the United States, and a resident of the city of Rochester, in the county of Monroe and State of New York, have invented a new and useful Electric Interlocking System, of which the following is a specification.

This invention relates to electric interlocking systems for railways, and more particularly to an interlocking system of the type employing the so called "dynamic indication" principle.

This application is a continuation in part of my two prior applications, Serial No. 101,894, filed June 6, 1916, and Serial No. 115,548, filed August 17, 1916.

Electric interlocking systems employing the dynamic indication principle are well known in the art and have been used to a large extent. Such systems, however, employ direct current for operating switches, signals, derails, and the like, conveniently termed functions; and the indication current given dynamically by each function is also a direct current. In some instances it is desirable to employ alternating current for operating the functions; but when it is attempted to use such alternating current for operating purposes, it has heretofore been found difficult to retain the dynamic indication principle, partly because the cross protection relays and other safety devices employed in the direct current system would not be adequate for an alternating current system, and also because of the fact that alternating current motors, as ordinarily constructed, cannot be relied upon to generate an indication current dynamically after each operation.

My invention contemplates the provision of suitable and adequate safety devices for alternating current electric interlocking systems, employing the dynamic indication principle, so that by using a motor capable of reliably generating an indication current dynamically, a safe, efficient and reliable system of electric interlocking can be produced.

Specifically considered, one of the objects of my invention is to devise a simple, reliable and adequate cross-protection device for alternating current systems which will act to prevent improper operation or wrong manipulation of the system on account of crosses, or other improper electrical conditions, between the operating wires of the same or different functions.

A still further object of the invention is a simple and reliable indication mechanism for alternating current electric interlocking systems which will serve to protect the system against false indication, by reason of the fact that such indication mechanism is responsive solely and only to the direct current used for indication purposes and is not affected by any alternating current finding its way for any reason through the indication mechanism of a function at any time.

Other objects and advantages of my invention will appear as the description progresses of the particular embodiment of my invention selected to illustrate its functions and characteristic features; and the novel features of my invention will be pointed out in the appended claims.

In describing the invention in detail, reference will be made to the accompanying drawings, in which is illustrated one preferred physical embodiment of the invention, in which like reference characters designate corresponding parts in the several views, and in which.

Figure 3:
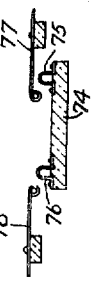
Figure 4:
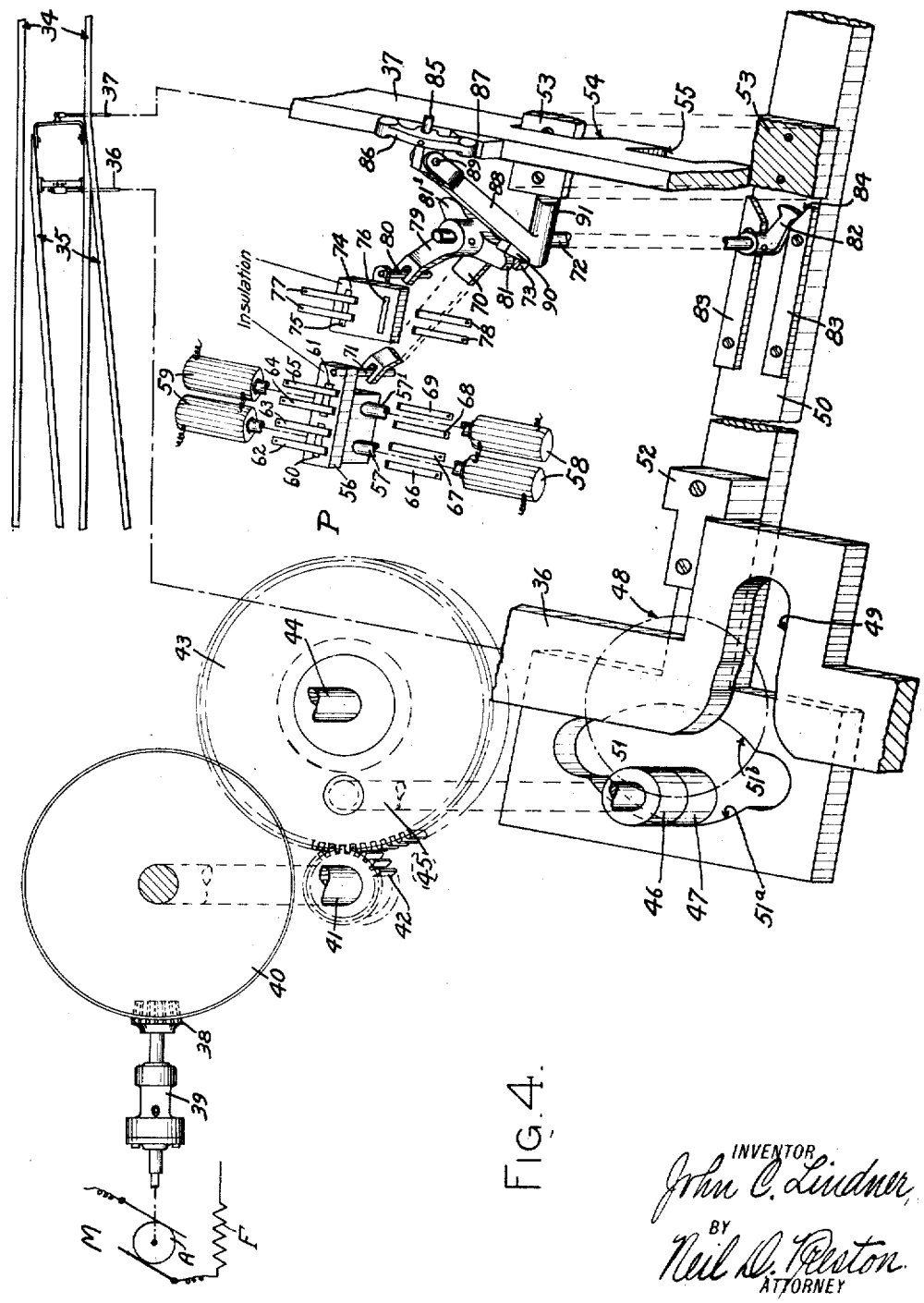

Fig. 3 is a partial transverse section of one of the circuit controllers on the switch machine, showing more in detail the form and relative arrangement of the contact pieces, together with the contact springs which cooperate therewith; and Fig. 4 is a diagrammatic view, partly in perspective with certain parts broken away and spread apart for clearness, showing in a simplified form the significant features of construction of the switch machine or switch operating mechanism which I preferably employ in my system.

Several of the parts and devices of the interlocking system embodying my invention have been employed in a direct current system, and since such devices are well known in the art, I have shown them in a simplified form, more with a view of making it easy to understand the construction and mode of operation of my invention, than to show the exact construction and arrangement of parts which would be employed in a commercial system.

In the usual electric interlocking system, each switch, signal or other function controlled by the interlocking machine, is governed by the manual manipulation of a slidable bar L, commonly termed a lever, which is provided with a suitable handle 6 for facilitating its manual movement. In the accompanying drawing only one lever L and its associated parts are shown, but it is to be understood that there are several such levers ordinarily included in each interlocking machine, and that each lever and its associated parts constitute a unit suitable for controlling one of the switches, signals or other functions. The different levers L of an interlocking machine are arranged so as to be controlled by any suitable form of mechanical interlocking, which being well known in the art has not been illustrated; and this mechanical interlocking is actuated by each lever L by means of a link 7, the upper end of which is provided with a roller engaging a cam slot 8 in the lever L, whereby the movement of the lever L causes a movement of the link 7 and the parts of the mechanical interlocking connected thereto.

The lever L is supported by a suitable guide 9, and on this guide is pivoted a latch 10 which is arranged so that, when one end is raised against the opposition of a spring 11, that end will cooperate with certain shoulders formed in the lower edge of the lever L so as to limit the movement of said lever in certain positions. Also pivoted to the guide 9 is an angle lever forming a dog or latch 12, which is arranged to catch under the adjacent end of the latch 10 and hold said latch in its upper locking position; and also pivoted to the guide 9 is a cam or tumbler 13 which is arranged so as to engage the dog 12 and swing it into position to hold the latch 10 in its locked position, the tumbler 13 being urged toward the position shown in the drawing by a spring 14 and being provided with upstanding teeth which are arranged to be engaged by abutments or shoulders formed along the lower edge of the lever L to move said tumbler 13 to swing the dog 12 into its locking position. The dog 12 is arranged to be tripped by a rod 15 attached to the armature 16 of the indication mechanism 1.

This indication mechanism 1 is so constructed and arranged that it will operate on direct current but will not operate on alternating current. The particular form of the indication mechanism shown comprises two electro-magnets arranged above and below the armature 16, each coil of the upper electro-magnet being provided with two windings 17 and 18 supported on the same core or pole pieces so as to be in inductive relation to each other, and each coil of the lower electro-magnet having a single winding 19, the terminals of which are connected by low resistance conductors 20 to the terminals of the winding 18 of the upper electro-magnet. Normally the armature 16 of the indication mechanism 1 rests on the pole pieces of the lower electro-magnet but is raised when direct current flows through the winding 17 of the upper electro-magnet in the usual way, so as to trip the dog 12. When the winding 17 of the upper electro-magnet is energized by alternating current, however, similar alternating current is induced in the winding 18 of this electro-magnet as will be clearly understood by those skilled in the art, and this induced current also flows through the winding 19 of the lower electro-magnet: and since the magnetic flux generated by the current induced in the winding 18 is opposite to the flux generated by the alternating current flowing in the winding 17, and since the flux generated by the induced current flowing in the winding 19 of the lower electro-magnet predominates in its pull upon the armature 16, due to the fact that this armature rests on the pole pieces of the lower electro-magnet, while there is a considerable air gap between said armature and the pole pieces of the upper electro-magnet, it is apparent that the armature 16 will not be attracted upward and will not operate to trip the dog 12.

The lever L governs the corresponding function by controlling certain electrical circuits, and for this purpose a rod 21 is connected to the lever L, and secured to said rod are two metallic contact blocks 22 and 23 insulated from each other and arranged to cooperate with pairs of contact springs 24, 25, 26 and 27.

The lever L has four significant positions, namely; first, its innermost position (shown in the drawing) which position is conveniently termed the normal position; second, the position in which the lever is pulled to its outermost extreme, which position is conveniently termed the reverse position; third, a position near the inner or normal position in which the contact blocks 22 and 23 make contact with the corresponding pairs of contact springs 26 and 27, but in which the rod 7 has not been forced down by the cam slot 8 to its lowermost position, this position of the lever being conveniently termed the normal indication position; and fourth, a position near the outer or reverse position in which the contact blocks 22 and 23 make contact with the corresponding pairs of contact springs 24 and 25, but in which the rod 7 has not been raised to its uppermost position, this latter position of the lever being conveniently termed the reverse indication position.

For a clear understanding of the operation and features of this invention a further detail description of the construction of the lever and the parts associated therewith is not deemed necessary; and if desirable a further description of the construction and operation of these parts may be had by referring to the patent to John D. Taylor, 752,127, February 16, 1904.

Supported in any convenient manner adjacent to the lever L is an indication selector comprising two electromagnets 28 and 29 between which and arranged to be attracted thereby is an armature or contact bar 30, said contact bar 30 being in contact with a contact spring 31 at all times and with contact springs 32 and 33 respectively in the two extremes of its movement. Other features of the construction and operation of the indication selector are described in the patent to W. K. Howe, 1,163,154, Dec. 7, 1915.

The protective device for preventing an improper operation of an interlocking system by a cross between operating wires or the like, is shown as comprising an alternating current relay R, which is preferably of the type commonly known in the art as a single element relay, that is, an alternating current relay having a single phase field, such as a relay of the well known vane type or one provided with a rotor and pole pieces having shading coils. The relay R is arranged to operate three contact fingers or armatures 34, 35 and 36 which are shown conventionally in the drawing. There is also associated with the relay R a manually operable switch K for the purpose hereinafter explained.

The parts of the electric interlocking system so far described are located in the tower or cabin, adjacent to which there is also located a suitable source of alternating current, as a transformer T, the primary of which is connected to a suitable source of alternating current; as a generator, and the secondary of which is connected by suitable conductors hereinafter pointed out in detail, which constitute the operating and control circuits of the function. This invention is shown applied to that part of an interlocking system used for operating a switch; and the parts of the interlocking system which are located at the switch are shown enclosed in a dotted rectangle designated 5.

The apparatus for unlocking, moving and locking the switch points of the switch, may be of any suitable or well known construction, but I prefer to use the switch machine shown and described in the patent to W. K. Howe, No. 1,288,595, Dec. 24, 1918. In Fig. 4 I have shown in a simplified and diagrammatic way the more essential and important parts of this switch machine, together with their application to a conventional switch. Referring to Fig. 4, the stock rails of the conventional single switch shown, are designated 34, and the movable switch points 35. These switch points 35 are connected in the usual way to a throw bar 36, and a lock rod 37, these parts being separated and shown to different scales for convenience and clearness. The throw bar 36 is moved back and forth by the operation of the machine, as hereinafter explained, to shift the switch points from the normal position, shown in Fig. 4, to the reverse position, and vice versa. The lock rod 37 is locked at the switch machine, as hereinafter explained, and serves to hold the switch points 35 in their normal or reverse position. The parts of the switch machine are operated by an electric motor M, preferably constructed as hereinafter explained. The armature A of this motor drives a bevel pinion 38 through a friction clutch 39 of any suitable construction, such as illustrated in the Patent 1,288,595 above noted. The bevel pinion 38 drives a beveled gear 40, and this gear in turn drives a shaft 41, to which is fixed a pinion 42 meshing with a main driving gear 43 journaled upon a fixed stud 44. Fastened to the main gear 43 is a downwardly extending driving pin or stud 45 which carries at its lower end two freely revoluble rollers 46 and 47. The driving pin 45 travels in a circular path, indicated by the dash line 48, as the main gear 43 revolves. The throw bar 36 is formed with a laterally opening jaw 49 shaped to receive the upper roller 46 of the main driving pin 45 as said roller travels in a circular path, in such a way that the throw bar is moved back and forth as the main gear 43 makes approximately one revolution first in one direction and then in the other. Extending lengthwise of the machine and supported by suitable guides, is a slidable bar or locking plunger 50. This locking plunger 50 is provided with an enlarged head at one end in which is formed a cam-shaped opening 51, of a general elliptical shape, the roller 47 on the driving pin 45 being disposed to co-operate with the faces of this cam shaped opening 51. Fastened to the locking plunger 50 is a lock dog 52 adapted to pass behind shoulders formed on the throw bar 36, so as to lock this throw bar against movement in one direction. In Fig. 4, the locking dog is shown as locking the throw bar 36 in the normal position of the switch points; and after the switch points have been operated to the reverse position, this locking dog moves behind the opposite shoulder on said throw bar and locks it in the reverse position. Near the other end of the locking plunger 50 is another lock dog 53 (which for convenience is shown as broken into two parts). This lock dog 53 is adapted to enter normal and reverse notches 54 and 55 in the lock rod 37. In Fig. 4 the lock dog 53 is illustrated as being in the normal notch 54, so as to hold the lock rod 37 against endwise movement in either direction; and when the switch points are operated to the reverse position and again locked up, the lock dog 53 enters the reverse notch 55 in the lock rod 37 and locks the switch points in their reverse position.

The motor operating circuits and the indication circuits are opened and closed selectively in accordance with the movement of the parts of the switch machine by a circuit controller, commonly termed a pole changer, which is illustrated in a simplified form in Fig. 4 as comprising a contact block or panel 56 of suitable insulating material. This contact block 56 is supported to slide horizontally by being carried by the cores 57—57¹ of two opposing pairs of solenoids 58 and 59, these cores being slidable in the solenoid. Fastened to the contact block 56 are two metallic contact or bridging pieces 60 and 61, which are arranged to contact with pairs of contact springs 62 to 65 with the contact block 56 in one extreme or normal position, as shown, and with similar contact springs 66 to 69 when said contact block is shifted to its other extreme or reverse position. The contact block 56 is shifted back and forth mechanically by an arm 70, one end of which is notched to straddle a pin 71 secured to said block 56. The arm 70 is journaled loosely upon a shaft 72 and is provided with laterally extending wings or lugs 73. (Only one of these lugs 73 appears in Fig. 4, the other being hidden by other parts, but the shape of these lugs is substantially the same as those designated 81 and 81¹ which are clearly shown.)

The switch machine includes another circuit controller which, in the simplified form illustrated, comprises a block 74 of suitable insulating material guided to move horizontally from the normal position shown to an opposite reverse position, similar to the movements of the contact block 56. This other contact block 74 carries two contact pieces 75 and 76. The contact piece 75 makes contact with a pair of contact springs 77 when the contact block 74 is in the normal position; and the contact piece 76 contacts with a similar pair of contact springs 78 in the reverse position of said block. Contact block 74 is moved back and forth by an arm 79, the outer end of which is formed with a slide to receive a pin 80 attached to said contact block. The hub of the arm 79 is fastened to the shaft 72 by a pin or other suitable means, and integral with said hub are two laterally extending lugs 81, 81¹, these lugs being the same shape as the lug 73 of the arm 70 and being disposed directly over the latter lugs. To the lower end of the shaft 72 is fastened a laterally extending foot or arm 82, the end portion of which is formed with flaring edges. Fastened to the locking plunger 50 are two guide bars 83 which are spaced apart for the greater part of their length a distance equal to the width of the head of the arm 82. These guide bars 83 are beveled off at one end, so as to flare apart, and these beveled ends are shaped to cooperate with the flared edges of the arm 82, in such a way that sliding movement of the locking plunger 50 (to the right as viewed in Fig. 4) acts to shift the arm 82 to its central position, for the purpose hereinafter explained.

Journaled in suitable supports (not shown) above the lock rod 37 and extending transversely thereof, is a shaft 85 to which is fixed a rocker 86. A block 87 is fastened to the upper edge of the lock rod 37 and is adapted to raise one end of the rocker 86 according to the position of said lock rod. A tripper arm 88 is pivotally connected at its upper end to the shaft 85 on a pin 89, so that this tripper arm may swing back and forth lengthwise of the machine, while being swung crosswise of the machine to opposite sides of the shaft 72 by a corresponding rocking movement of the shaft 85. The lower end of the tripper arm 88 is provided with a lug 90 adapted to engage those wings 81 and 73 of the levers 79 and 70 respectively, which are on the corresponding side of the shaft 72; and said tripper arm is also provided with an extension 91 adapted to be engaged by the lock rod 53.

Detail features of the construction and operation of the switch machine referred to are described in the Patent 1,288,595 above mentioned; and I will explain only briefly the operation of this switch machine. The parts are shown in the normal position in Fig. 4. When the motor is supplied with operating current, as hereinafter explained, with a view of moving the switch points to the reverse position, the main gear 43 and the driving pin 45 are rotated in a counter-clockwise position as viewed in Fig. 4. The roller 47 engages the cam face 51ᵇ and moves the locking plunger 50 endwise (to the right as viewed in Fig. 4). This moves the lock dog 52 out of locking engagement with the throw bar 30 and likewise the lock dog 53 out of the normal notch 54 of the lock rod 37, thereby freeing said throw bar and lock rod to permit the switch points to be shifted. During this movement of the locking plunger 50 the foot 82 is swung to the middle position, and the arm 79 being fastened to the shaft 72, is swung to bring the contact block 74 to the middle position. This action does not concern the ordinary operation of the machine, but results in making it possible to reverse the switch points in midstroke, as explained more fully hereinafter. It should be noted that the arm 70, being loose on the shaft 72, remains in the normal position shown. As the lock dog 53 is withdrawn, the tripper arm 88 swings back by its own weight and hangs vertically. After the unlocking of the switch points, produced by the cooperation of the roller 47 with the cam face 51ᵇ, has occurred, the roller 46 enters the jaw 49 and moves the throw bar 36 to shift the switch points 35 to the reverse position. The lock rod 37 follows the movement of the switch points and assumes its reverse position, in which the block 87 engages the opposite end of the rocker 86 and swings the tripper 88 to the opposite side of the shaft 72. Also, the reverse notch 55 in the lock rod 37 is brought opposite the lock dog 53. After the movement of the throw bar is completed, the roller 46 leaves the jaw 49, and shortly thereafter the roller 47 engages the cam face 51ᵃ, and returns the locking plunger 50 to re-lock the machine. Upon the final movement of this locking plunger 50 the lock dog 53 engages the extension 91 on the tripper arm 88, and since this tripper arm is now on the opposite side of the shaft 72 from that shown, said tripper arm engages the wings 81ʲ and 73ʲ (not shown) resulting in shifting contact blocks 56 and 74 to the opposite extreme, or reverse position. The movement of the contact block 56 results in the interruption of the operating circuits supplying current to the motor and the establishing of the indication circuits, as hereinafter explained. The motor, being now acting as a generator, is gradually slowed down or "snubbed," so that the main gear 43 and the driving pin 45 come to rest approximately in the position shown. The indication current generated dynamically by the motor is transmitted to the tower and serves to operate the indication mechanism, thereby signifying that the switch points have been properly moved and locked. The sequence of operation and movement of the parts in shifting the switch from the reverse position to the normal position is similar to the operation already described and will be readily understood without detail explanation.

Figure 2:
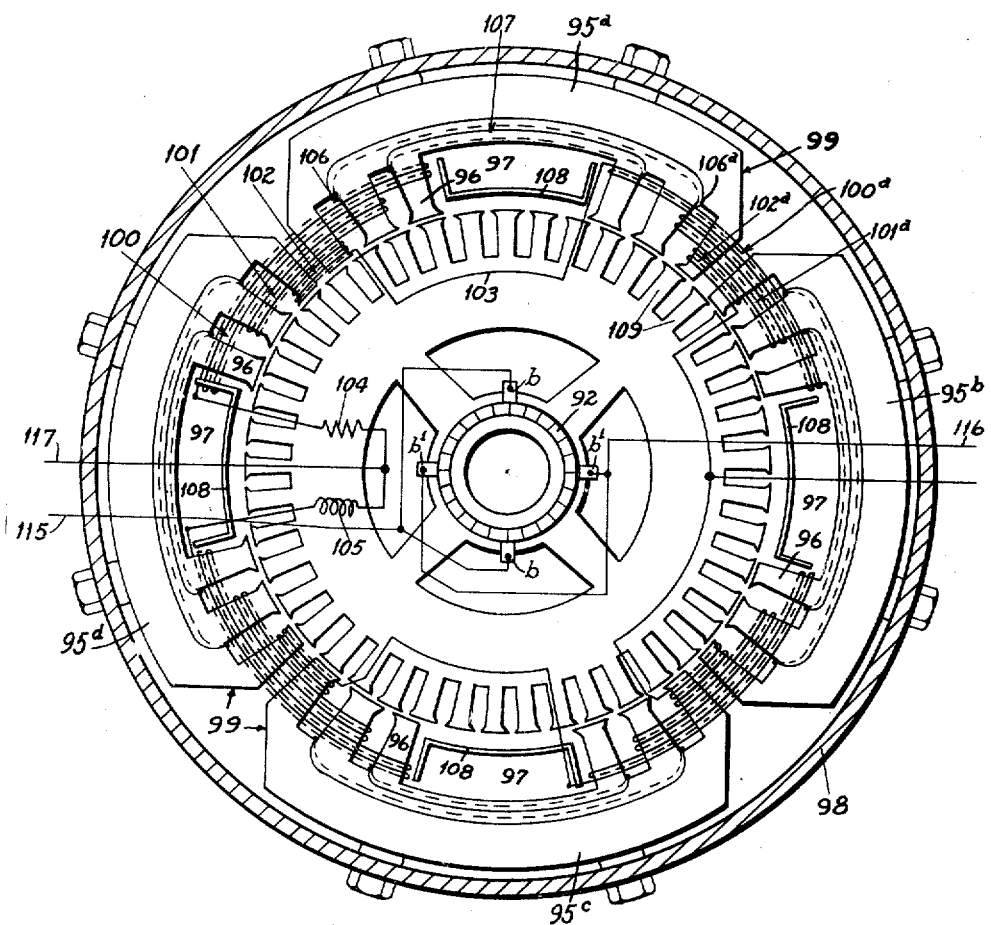
Fig. 2 is a diagrammatic view of the motor which is preferably employed in my system of interlocking.

The motor M for operating the switch machine may be of any suitable construction, providing it will operate efficiently on alternating current, preferably with series characteristics, and will also act to generate a direct current dynamically without fail when the operating current is cut off and its armature and field are connected into the indication circuit. The motor I prefer to use is one having the features of construction shown and described in the application of James Burke, Serial No. 147,325, filed February 8, 1917, now Patent No. 1,367,298, February 1, 1921. In Figure 2 of the accompanying drawings I have shown diagrammatically the significant features of construction of this motor, including the field structure and field winding. Referring to Figure 2, the field winding or stator of the motor is divided into four sections 95ᵃ, 95ᵇ, 95ᶜ and 95ᵈ, each section being made up of laminae of the shape shown, with teeth 96 (three being shown) at each end of the section with a comparatively large intervening opening 97. These laminae are built up to produce a stator of the requisite thickness; but instead of using laminae of uniform magnetic characteristics, some of the laminae are preferably made of a harder steel, or a steel of different composition, or a material otherwise differing magnetically from the material used in the remaining laminae. The proportion of the hardened laminae may be varied and it is found that good results are obtained when the laminae constitute about one-tenth to one-fifth of the total stator laminae. Each stator section 95ᵃ to 95ᵈ is spaced from the adjoining sections, as shown in Figure 2, about the width of a slot between the teeth 96; and each section is cut away at its corners as indicated by the numeral 99 so as to reduce the magnetic conductivity between adjoining sections. The four stator sections 95ᵃ to 95ᵈ are suitably supported in a frame or housing 98, preferably of some non-magnetic material, like brass.

The four field poles are formed by the teeth 96 of the two end portions of adjoining stator sections. The field winding, which is a distributed winding, is illustrated as made up of three coils per pole, the number of turns per coil being a suitable number, and, of course, much more than the two turns which have been shown for convenience. Tracing the field winding and starting at the upper left-hand pole, the turns of the outer coil 100 which embraces the three teeth 96 of the stator section 95ᵈ and the three teeth 96 of the stator section 95ᵃ. This coil 100 is connected in series with the next coil 101 which embraces two teeth of each of said sections; and this coil in turn is connected in series with the inner coil 102 embracing only one tooth of said adjoining section. The terminal of the inner coil 102 is connected by conductor 103 to the outer coil 100ᵃ of the winding for the next right-hand field pole, this coil 100ᵃ embracing three teeth of each of the adjacent sections 95ᵃ and 95ᵇ, the same as in the case of the coil 100. The coil 100ᵃ is connected in series to coils 101ᵃ and 102ᵃ in the same way previously described, these coils, however, being wound reversely to those of the winding for the other pole so as to give the necessary polarity. The windings for the remaining poles are the same, successive poles being of opposite polarity. The field coils are connected in multiple in pairs, the coils for the two upper field poles shown in Fig. 2 being connected in series with each other and in multiple with the coils for the two lower field poles, which in turn are connected in series with each other. The two upper and lower pairs of field coils are made of different impedance. As shown, a non-inductive resistance 104 is connected in series with the windings of the upper field poles, and an inductive resistance 105 in series with the windings of the lower field poles. As a result, the currents in the upper and lower windings are out of phase with each other, for the purpose hereinafter explained. Various means may be employed for obtaining this phase displacement, as will be readily understood by those skilled in the art. A difference in phase of about ten electrical degrees has been found to produce good results.

The stator is provided with compensating windings, comprising short circuited coils of very low resistance located in the end slots of each section 95ᵃ to 95ᵈ. For example, in the slot nearest one end of the section 95ᵃ is a conductor 106, and in the corresponding slot at the other end of said section is another conductor 106ᵃ; and these two conductors are connected by end connections, as indicated diagrammatically, the turns having very low resistance and being in bar or plate form if desired. Similarly, a closed coil 107 is located in the other slots of the section 95ᵃ. In the central space 97 of each section is a plate 108 of low resistance preferably provided with bent up end portions for conveniently holding the plate in position.

The armature of the motor is made up of laminæ having teeth 109, preferably bearing an incommensurate relation to the number of teeth of the field poles. The armature winding may be of any suitable form capable of giving the desired performance in an alternating current series motor; and for simplicity this winding has not been shown. The motor is provided with the usual commutator designated 92, and with suitable brushes which are designated b and b¹.

The particular features of the motor adapting it for use in an alternating current electric interlocking system reside in the expedients employed to preserve an appreciable amount of residual magnetism in the magnetic circuits of the stator, so as to positively insure the building up of a magnetic field when the motor is connected into the indication circuit and acts as a generator. The use of laminæ of different magnetic characteristics in the stator results in the cycle of magnetization of some of the laminæ being delayed or lagging behind the cycle in the other laminæ; and the laminæ of different magnetic characteristics, such as soft and hardened, being subjected to the same magneto-motive force, certain of the laminæ will always, it is found in practice retain an appreciable amount of residual magnetism, regardless of the particular instant or portion of the cycle the alternating current is cut off. Also, with the field windings connected in multiple as described, and the magnetizing current in these windings being out of phase, the conditions are such that, regardless of the instant when the alternating current is interrupted, there will always be an appreciable current passing through at least some of the field windings at the instant of interruption, thereby resulting in some of the poles being left with an appreciable amount of magnetism. It will be noted that the stator construction is such that the flux paths or magnetic circuit for the flux created by the currents differing in phase, are segregated so as to obviate the possibility of neutralizing action of the currents of different phase. Actual use of this motor has demonstrated that there will always be sufficient residual magnetism in the stator to permit the motor to operate as a generator, and pick up and self-excite its field so as to supply a direct current which may be used for indication purposes. In an interlocking system the momentum of the armature of the motor, after the operation of the function has been completed, supplies the energy for generating the indication current. The act of generating this indication also results in braking or snubbing the armature of the motor, so as to bring it easily to a stop without shock and jar.

Figure 1:
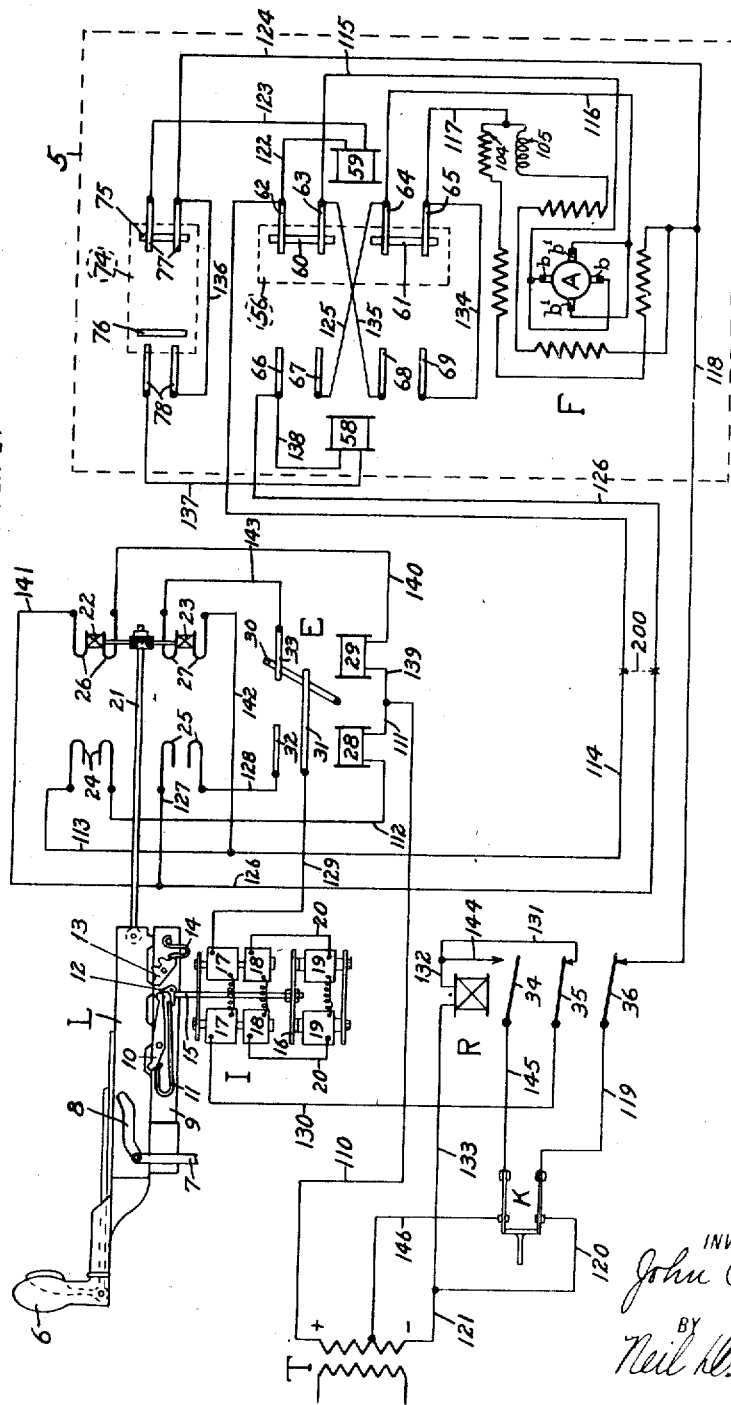
Figure 1 is a diagrammatic view, in the nature of a wiring diagram, showing the parts of an electric interlocking system embodying the invention, together with the electrical connection between several parts.

Operation: In order to obtain a clear understanding of the functions performed by the cross-protection relay, under the abnormal conditions produced by a cross, and also the features of safety obtained by the use of the indication mechanism shown and described, it is expedient to consider first the operation of the system under normal and ordinary working conditions, and I will first describe briefly the operation of the system and the various circuits established in moving the switch from its normal position to its reverse position. Referring to Figure 1, the parts are illustrated in the positions corresponding to the normal position of the switch, and to move the switch to its reverse position, the lever L, is pulled out to the left, as viewed in Figure 1, to its reverse indication position, to which it may be moved without opposition, provided the mechanical locking permits. The lever L, however, cannot be moved beyond this point on account of the action of the indication latch 10. In the reverse indication position the contact blocks 22 and 23 make contact with the pairs of contact springs 24 and 25. With the contact blocks in this position, current will be supplied from the transformer T for operating the motor of the switch machine along a circuit which may be traced as follows: commencing at the upper terminal of the secondary of the transformer T, conductors 110 and 111, magnet 28 of the indication selector, conductor 112, contact springs 24 and contact block 22, conductors 113 and 114, contact spring 62, contact piece 60, contact spring 63, conductor 115, armature A of the motor, conductor 116, contact spring 64, contact piece 61, contact spring 65, conductor 117 through the field of the motor, common return wire 118, armature 36 of the relay R, conductor 119, switch K, conductors 120 and 121 back to the other terminal of said secondary. The normal pole changer operating coils 59 are also energized at this time by current flowing in a branch circuit which may be traced as follows: commencing at the contact spring 62, conductor 122, coils 59, conductor 123, contact springs 77, contact piece 75, conductor 124 to the common return wire 118. The energization of these pole changer coils 59 at this time merely serves to maintain the contact block 56 in its normal existing position.

Current flowing in the reverse operating circuit just traced energizes the magnet 28 of the indication selector and moves the contact bar 30 from the position shown to its other extreme position, ready to establish the indication circuit. The detail significance of this operation forms no part of the present invention and is explained more fully in the patent to W. K. Howe, 1,163,154, mentioned above. The reverse operating circuit also supplies current to the motor at the switch and causes this motor to unlock the switch points, move them to the reverse position, and then lock them again, all as previously explained in describing the operation of the switch machine shown in Figure 4. As soon as the switch points are shifted to the reverse position and locked up, the contact block 56 is shifted from the position shown to its opposite extreme position, thereby interrupting the reverse operating circuit and establishing the reverse indication circuit, this latter circuit being traced as follows: commencing at the armature A of the motor, conductors 116 and 125, contact spring 67, contact piece 60 (now shifted into contact therewith) contact spring 66, conductors 126 and 127, contact springs 25 and contact block 23 (the lever L being in the reverse indication position), conductor 128, contact spring 32, contact arm 30 (this arm having been previously shifted by magnet 28), contact spring 31, conductor 129, winding 17 of the indication mechanism, conductor 130, armature 35 of the relay R, conductors 131 and 132, relay R, conductors 133 and 120, switch K, conductor 119, armature 36 of the relay R, conductor 118 through the field of the motor, conductors 117 and 134, contact spring 69, contact piece 61, contact spring 68, conductors 135 and 115 back to the armature.

The armature of the motor continues to rotate due to its acquired momentum, and when the indication circuit just traced is established, the motor is connected into a closed circuit and is in condition to act as a generator, it being noted that the armature and field of the motor are relatively reversed in the indication circuit opposite to their connection in the operating circuit, so that the small current generated in the armature by the residual magnetism of the stator flows through the windings of the stator in the right direction to build up this magnetism. The indication current thus generated, although of limited duration, energizes the winding 17 of the indication mechanism sufficiently to raise the armature 16, trips the dog 12, and releases the latch 10, thereby permitting the lever L to be pulled to its full reverse position. The movement of the lever L to its full reverse position does not alter the circuits set up at the time, and the function and the lever are now at rest with the indication circuit last traced intact. It should be observed that the indication current, being direct current, does not affect the relay R, nor cause the windings 18 and 19 of the indication mechanism to interfere with the movement of the armature 16.

It should be noted that in the arrangement shown in Figs. 1 and 4, the pole changer coils 58 are connected in multiple with the field and armature of the motor, at the time the indication current is generated, the conducting path constituting this multiple connection being traced as follows: commencing at the armature A of the motor, conductors 115 and 135, contact springs 68 and 69, and contact piece 61, conductors 134 and 117, field of the motor, conductors 124 and 136, contact springs 78, contact piece 76, conductor 137, coils 58, conductor 138, contact springs 66—67 and contact piece 60, conductors 125 and 116 back to the armature. In practice, the pole changer coils 58 and 59 are of comparatively high impedance to alternating current, but are of comparatively low ohmic resistance. It is found that this comparatively low resistance path around the armature and field of the motor at the time it is building up its field flux to generate indication current serves to improve the performance of the motor in generating indication current, especially where the function is located at a considerable distance from the tower so that the line resistance is comparatively high. I do not attempt to explain the theory of this operation; and while the motor will generate indication current satisfactorily with the pole changer coils in multiple therewith in many instances, in other instances it appears to be desirable to exclude these pole changer coils at the instant when the motor is building up the indication current. In the latter instances, I employ the construction of contact springs 77 and 78 and contact pieces 75 and 76 illustrated in Figure 3. In this construction, it will be noted that the contact pieces 75 or 76 do not make contact with their corresponding pair of contact springs 77 or 78 when the contact block 74 is in the extreme normal or reverse position. When, however, as previously explained, the switch machine commences to unlock, the contact block 74 is moved to the middle position, in which both pairs of contact springs 77 and 78 are bridged by their corresponding contact pieces 75.

The operation of moving the switch points from their reverse position to their normal position involves analogous movements and circuits and need not be described in detail.

The pole changer coils 58 and 59 are employed to permit the switch points to be reversed if occasion requires. For example, some obstruction, as a piece of coal, may prevent the switch points being fully thrown at the first attempt; and it is desirable that the towerman be able to restore the partially thrown switch to its former position. The towerman returns the switch to its former position, after it is partly thrown, by merely moving his lever L back to its former position. For example, if an attempt has been made to throw the switch to the reverse position, the lever L is returned to the normal indication position; and since the switch is partially thrown, the pairs of contact springs 77 and 78 are both bridged by the contact pieces 75 and 76, and with the lever L in the normal indication position, current is supplied to the pole changer coils 58, current being cut off of the opposing coils 59. As a result, the contact block 56, being free to move, because the switch machine has partially operated, is attracted by the coils 58 to its opposite extreme position, whereupon the operating circuit for restoring the switch machine to its normal position is established. When the switch is returned to its normal position, the towerman gets an indication and then trys again.

With this brief description of the operation of the system under the usual and normal working conditions, it is now possible to explain the function performed by the protective relay R when abnormal conditions due to a cross or the like exist. One example would serve to illustrate the protection afforded by the relay R; and for a simple illustration, assume that a cross, as indicated at 200, is improperly made between the two control wires, this improper connection being due to the breaking down of the insulation of these wires, or any other cause which results in a conducting path being established between said wires. With such a cross 200, and with the parts in their normal position, it can be seen that unless some special protection is afforded, the switch machine may be operated to move the switch to the reverse position, although the lever L still remains in its normal position. To illustrate, disregarding for the moment the action of the protective relay R, current may flow from the secondary of the transformer T out to the motor of the switch machine by reason of the existence of a circuit which may be traced as follows: commencing at one terminal of the secondary of the transformer T, conductors 110 and 139, selector magnet 29, conductor 140, contact springs 26 and the contact block 22, conductor 141, thence along conductors 126 to the point where the cross 200 occurs, thence through said cross connection to conductor 114, and thence out to the switch machine and through the motor along the same path heretofore pointed out in explaining the operation of moving the switch from the normal position to the reverse position. If current were supplied to the motor in this way, it would cause operation of the switch machine, and this would result in placing the switch points in the reverse position while the lever L remains in the normal condition—something which cannot be tolerated in an interlocking system where safety requires that a function should always be in exact correspondence with its controlling lever. The dangerous condition just described is obviated by the action of the protective relay R. At the point where the improper cross 200 exists, current may flow back along the control wire 114, as well as out to the motor at the switch machine, the path for such current being traced as follows: commencing at the cross 200, control wire 114, conductor 142, contact springs 27 and contact block 23, conductor 143, contacts 33—30—31 of the indication selector, conductor 129, coils 17 of the indication mechanism, conductor 130, armature 35 of the relay B, conductors 131 and 132, windings of the relay R and conductors 133 and 121 back to the other terminal of the transformer T. This last traced path through the indication mechanism and the relay R is of comparatively low resistance so that a large proportion of this current passes through the relay R. The current in question is alternating current, being supplied from the transformer T, and this alternating current operates the relay R and causes it to attract its armature or other movable element and raise the contact fingers or armatures 34, 35 and 36 shown in Figure 1. The raising of the armature 36 interrupts the connection from the common return wire 118 to the transformer T, thereby interrupting the flow of current through the motor at the switch machine and preventing operation thereof. The raising of the armature 35 interrupts the branch circuit through the indication mechanism 1, thereby economizing in current preventing the overheating of the coils of the indication mechanism, and obviating any other difficulties which might result from the continued flow of current through said indication mechanism. The raising of the armature 34 of the relay R establishes a stick circuit for maintaining said relay R energized independently of the branch circuit through the indication mechanism, said stick circuit being traced as follows: commencing at the lower terminal of the transformer T, conductors 121 and 133, relay R, conductors 32 and 144, armature 34, conductor 145, switch K and conductor 146, preferably to an intermediate tap in said secondary, this intermediate tap being used so that the current applied to the relay R is not strong enough to injure or heat the windings of the relay, although continued for some time.

From the foregoing it will be evident that the relay R operates instantly to automatically disconnect the motor of the switch machine from the transformer T, in case an improper connection, such as the cross 200, is established between the two control wires 114 and 126. Further, the relay R, having once been initially operated, is maintained energized, by reason of its stick circuit, until manually restored. The manual restoration of the relay R is accomplished by opening the switch K. This interrupts the stick circuit and permits the armature of said relay to return to the normal position in response to the bias provided in such relays. The opening of the switch K also interrupts the connection from conductor 119 and 120, so as to open another break in the common return connection from the switch machine to the transformer K. Consequently, although the armature 36 of the relay R falls back to its normal position, there is no current supplied to the motor of the switch machine, though the cross 200 may still exist. Before the function in question can be operated the switch K must be reclosed. If the cross still exists, the relay R is again immediately energized, and with the switch K closed, the relay R is again maintained energized. In this way, so long as the cross 200 exists the common return connection from the motor to the source of current cannot be permanently established, and no attempts of the operator to use this function are effective until the cross has been detected and removed.

It will be observed that when the function is at rest, there is a closed circuit including the relay R, the indication mechanism 1, and the motor, this closed circuit being the same as the indication circuit last used. Also, this circuit is connected to one terminal of the transformer (this connection being conductor 121 in Fig. 1). Consequently, improper supply of current to the motor, tending to operate it falsely, must necessarily have a branch path through the protective relay R, regardless of how this improper supply of current is obtained. Thus, the system is protected against crosses other than the one indicated at 200, as for example, when the operating wire of one function connected to the source of current is crossed up with the operating wire of another function, all as will be clearly understood by those skilled in the art.

It is also characteristic of this system that the relay R is included in the indication circuits, so that the integrity of the winding of this relay is checked at each operation of the function. Obviously, various modifications and amplifications of the principle of cross protection shown and described may be made without departing from the invention. I prefer to use a vane-type signal element relay for the protective relay R; but obviously other electro-magnetic devices could be used for the same purpose, providing they will respond to alternating current but not to direct current. In the embodiment of the invention illustrated, the protective relay R has been shown as arranged to interrupt the common return connection of the particular function affected; but obviously, the practice sometimes employed of having the cross protection relay act to interrupt a common return connection for several functions, may be used if desired.

The indication mechanism 1, as previously explained, is constructed so as to be responsive to direct current, but not to alternating current. This is done in order to obviate any possibility of obtaining a false indication from a source of alternating current used for operating the functions, regardless of how this alternating current may find its way through the indication mechanism. This feature of my invention is important because the various combinations of crosses and other conditions which may occur in practice are very numerous, and in some instances it is possible for the alternating current to find its way through the indication mechanism just at the instant the operator is expecting an indication; and there being no way to distinguish between operation of the indication mechanism by indication current properly generated, or by alternating current improperly applied, the indication mechanism, if operable by alternating current, as well as direct current, might give a false indication.

Although I have particularly described the construction of one physical embodiment of my invention, and explained the operation and principle thereof; nevertheless, I desire to have it understood that the form selected is merely illustrative, but does not exhaust the possible physical embodiments of the idea of means underlying my invention.

What I claim as new and desire to secure by Letters Patent of the United States, is:

1. In an electric interlocking system, the combination with a plurality of functions each actuated by an electric motor adapted to be operated by alternating current and to generate direct current dynamically, a source of alternating current, a lever for each function controlling the connection between said source and the electric motor thereof, an individual return connection from the motor of each function to said source, an indication circuit for each function closed while it is at rest in one of its positions, and electromagnetic means in said indication circuit for each function operable by alternating current but not direct current for interrupting the corresponding return connection from that function, whereby whenever current is improperly supplied to any function from said source tending to operate its motor, said electromagnetic means operates to break the return connection between that motor and the source without interfering with the operation of the other functions.

2. In an electric interlocking system, the combination with a source of alternating current, a track switch, a motor for operating the switch, a circuit closed when the switch is at rest in one position and including a return connection between said motor and said source, a normally closed circuit controller in said return connection, and electroresponsive means of the induction type operated by the flow of alternating current in said circuit but not operated by direct current therein for opening said circuit controller and for maintaining it open until manually restored.

3. An alternating current electric interlocking system comprising, in combination, a function actuated by an electric motor adapted to be operated by alternating current and to generate direct current dynamically, a source of alternating current, a lever, indication mechanism for the lever, circuits controlled by said lever and also in accordance with the position of the function, said circuits being used alternately for conducting current from said source to the function for operating the motor and for conducting indication current back from the motor to said indication mechanism of the lever, said circuits each including a common return connection between the motor and said source, a circuit controller in said return connection, an electroresponsive means for opening said circuit controller comprising a winding and a movable element influenced by induction if alternating current flows in said winding, said winding being included by the movement of the lever in said circuits alternately as they are used for conducting indication current.

4. In an electric interlocking system, of the type in which alternating current is used for operating the functions and direct current is used for indication purposes, the combination with a lever and indication mechanism therefor comprising a movable member, of electro-magnetic means for operating said member, said means having an operating winding and a short circuited winding arranged in inductive relation, whereby the system is protected against false indication because the indication magnet will respond to direct current generated dynamically but will not be operated by the alternating current used for operating the functions.

5. In an electric interlocking system, of the type in which alternating current is used for operating the functions and direct current is used for indication purposes, indication mechanism comprising a movable member, an electromagnet for attracting said member having two windings arranged in inductive relation; another electro-magnet disposed on the opposite side of said member from said first electro-magnet, said member being normally closer to the pole pieces of the second electro-magnet than to the first electro-magnet; and electrical conductors of low resistance connecting said second electro-magnet and one of the windings of the first electro-magnet.

6. An electric interlocking system comprising, a source of alternating current, an electrically operable function, a lever controlling the supply of current from said source to the function, means arresting the movement of said lever in an indication position, a vertically movable plunger acting when raised to actuate said means to release the lever, an armature attached to said plunger, a pair of cores above said armature and spaced from its ends by equal air gaps, coils on said cores, and means on said cores between the coils thereon and the armature in which current is induced by the flow of alternating current in said coils and thereby opposing the passage of alternating flux through said armature and preventing its upward attraction.

7. An interlocking system comprising a source of alternating current, an electrically operable function, a lever and control circuits for governing the supply of current from said source to the function, and indication mechanism for said lever operable by direct current but not alternating current, said indication mechanism comprising a spring-pressed latch, a dog for retaining the latch in its holding position, a plunger for tripping the dog to release the latch, and electro-magnetic means for operating the plunger.

8. In an electric interlocking system of the type in which alternating current is used for operating the functions and direct current for indication purposes and in which the indication circuits include the motor of the function and a common return connection, the combination with said indication circuits, of indication mechanism responsive to direct current but not to alternating current and included in said indication circuits alternately and a separate cross protection device responsive to alternating current but not to direct current and also included in said indication circuits alternately for governing the continuity of said return connection and the indication circuit in which said device is then included.

9. In an electric interlocking system of the type in which alternating current is used for operating the functions and direct current for indication purposes and in which two wires extending from the function to its controlling lever are alternately used with a common return connection to form both the operating circuits and the indication circuits, the combination with said indication circuits, of an indication magnet responsive to direct current but not to alternating current, said magnet comprising a pair of cores and an armature normally spaced at its ends from said cores by equal air gaps.

10. In an interlocking system, in combination: a source of alternating current; an electrically operated function adapted to generate a direct current dynamically after each operation; a deenergized circuit which is closed when the function is at rest; and means for interrupting said circuit when alternating current flows therein; said means not being affected by direct current.

11. In an interlocking system, in combination: a source of alternating current; an electrically operable function adapted to generate a direct current dynamically after each operation; a return connection from said function to said source of current; an indication circuit including said return connection which is closed when said function has operated and is at rest; a circuit controller arranged to interrupt said return connection; and electromagnetic means operable by alternating current and not by direct current and interposed in said indication circuit for controlling said circuit controller.

12. In an interlocking system, in combination; a source of alternating current; an electrically operated function adapted to generate a direct current dynamically after each operation; a return connection from said function to said source of current; a circuit which is closed when said function is at rest; electromagnetic means operable by alternating current and not by direct current for interrupting said return connection when alternating current flows in said circuit; and means for maintaining said electromagnetic means in its operated condition after it has been initially operated.

13. In an interlocking system, in combination; a source of alternating current; an electrically operable function adapted to generate a direct current dynamically after each operation; a circuit controlling lever for controlling said function; indication mechanism for said lever; a circuit including said indication mechanism which is closed when said function is at rest; and means responsive to alternating current but not to direct current included in said circuit for making a break in said circuit and for maintaining said break until manually restored.

14. In an interlocking system, in combination; a source of alternating current; an electrically operable function adapted to generate a direct current dynamically after each operation; a return connection from said function to said source of current; an indication circuit including said return connection which is closed when said function has operated and is at rest; a circuit controller arranged to interrupt said return connection; an alternating current relay included in said indication circuit for operating said circuit controller; a stick circuit for said relay which is automatically closed when said relay is operated; and manually operable means for interrupting said stick circuit and said return connection simultaneously.

15. In an interlocking system for railroads, in combination; a source of alternating current; a function adapted to be operated to either of two different positions; an electric motor operatively connected to the function and adapted to be operated by alternating current and to generate direct current dynamically; control circuits for the function including a common return connection; a circuit controlling lever at a distant point for controlling the connection between the control circuits and said source of current; a partial circuit; electromagnetic means responsive to alternating current but not to direct current flowing in said partial circuit for interrupting said common return connection; and means controlled by said lever for including said partial circuit in each control circuit in turn when the other control circuit is connected to the source of current.

16. In an interlocking system for railroads, in combination: a source of alternating current; a function actuated by an electric motor adapted to be operated by alternating current and to generate direct current dynamically; control circuits for the function including a common return connection to one terminal of the source of current; electro-magnetic means responsive to alternating current but not to direct current for interrupting said return connection; and a circuit controlling lever for connecting said circuits alternately to the other terminal of the source, and for connecting said electromagnetic means into the other circuit which is not then connected to the source.

17. In an interlocking system for railroads, in combination: a source of alternating current at a control point; a function at a distant point actuated by an electric motor adapted to be operated by alternating current and to generate direct current dynamically; wires for conducting both operating and indication currents extending from the control point to the function; circuit controlling means operated automatically in accordance with the movement of the function for alternately connecting said wires to the motor; a common return connection from the motor to one terminal of the source; electromagnetic means responsive to alternating current but not to direct current for interrupting said return connection; a circuit controlling lever at the control point adapted to alternately connect said wires to the other terminal of said source; and indication mechanism for the lever, said lever also connecting said indication mechanism and said electromagnetic means in circuit with said return connection and the wire then not connected to the source, thereby forming an indication circuit which remains closed after the function has made its corresponding movement and is at rest.

18. An alternating current electric interlocking system comprising, a source of alternating current, a function actuated by an electric motor adapted to be operated by alternating current from said source and to generate direct current dynamically after each operation for indication purposes, an indication circuit including said motor and closed while the function is at rest, a return connection from the motor to said source forming part of said circuit, a circuit controller for breaking said return connection, electromagnetic means of the induction type operable by alternating current but not direct current for opening said circuit controller and for maintaining it open until restored whenever alternating current flows in said indication circuit, and means for restoring said means and acting while in the restoring condition to maintain said return connection broken.

19. In an interlocking system for railroads, in combination: a source of alternating current at a control point; a function at a distant point actuated by an electric motor adapted to be operated by alternating current and to generate direct current dynamically; combined operating and indicating wires for the function; means operated automatically in accordance with the movement of the function for alternately connecting said wires to the motor, the operating wire for one position of the function being the indicating wire for the other position; a common return connection extending from the motor to one terminal of the source of current; a lever at the control point; indication mechanism for the lever; electromagnetic means responsive to alternating current but not to direct current for interrupting said return connection; a partial circuit including said indication mechanism and said electromagnetic means, and connected to said common return connection; and circuit controlling means operated by the lever for alternately connecting said wires one to the source and the other to said partial circuit, whereby when the function is at rest its motor is connected in a closed circuit including said electromagnetic means so that current improperly supplied from the source and tending to operate the motor will cause operation of the electromagnetic means and interrupt the return connection.

20. In an interlocking system for railroads, in combination: a source of alternating current; a function actuated by an electric motor adapted to be operated by alternating current and to generate direct current dynamically; operating circuits for the motor including a common return connection; indication circuits for said function each closed when the function is at rest in a corresponding position, the parts of each indication circuit extending to and through the function constituting parts of the next operating circuit; and electromagnetic means alternately included in each indication circuit and responsive to alternating current but not to direct current for automatically interrupting said return connection and the corresponding indication circuit whenever alternating current is improperly supplied to the motor of the function at rest.

21. In an interlocking system for railroads, in combination: a source of alternating current; a function actuated by an electric motor adapted to be operated by alternating current and to generate direct current dynamically; a return connection from the motor to the source; a circuit controller in said return connection; a circuit including the motor and the return connection which is closed when the function is at rest in the corresponding position and which constitutes part of the next operating circuits; and electromagnetic means responsive to alternating current but not to direct current for opening said circuit controller and maintaining it open until manually restored, whereby when the function is at rest current from said source improperly supplied to the operating circuit for the next position of the function will automatically interrupt its own circuit by causing operation of said electro-magnetic means.

22. In an interlocking system for railroads, in combination: a source of alternating current; a function at a distant point actuated by an electric motor adapted to be operated by alternating current; operating circuits for the motor including a common return connection; electromagnetic means responsive to alternating current for interrupting said return connection and for maintaining it open until manually restored; manually operable restoring means for said electro-magnetic means acting to break said common return connection at another point when operated; and means for establishing a circuit for each position of the function which includes the motor and said electromagnetic means and which is closed when the function is at rest.

23. In an electric interlocking system of the type in which alternating current is used for operating the functions and direct current for indication purposes, and in which the indication circuits include the motor of the function and a common return connection, the combination with said indication circuits, of electromagnetic means included in said indication circuits and responsive to alternating current but not to direct current, and a circuit controller operated by said means and included in said common return connection.

24. In an electric interlocking system of the type in which alternating current is used for operating the functions and direct current for indication purposes and in which the indication circuits include the motor of the functon and a common return connecton, the combination with said indication circuits, of a single element alternating current relay included in said indication circuits and circuit controlling means governed by said relay for interrupting said return connection.

25. In an electric interlocking system of the type in which alternating current is used for operating the functions and direct current for indication purposes and in which the indication circuits include the motor of the function and a common return connection, the combination with said indication circuits, of an electromagnetic device included in each indication circuit and responsive to alternating current but not to direct current and circuit controlling means operated by said device for interrupting said common return connection and for maintaining such interruption until manually restored.

26. In an electric interlocking system of the type in which alternating current is used for operating the functions and direct current for indication purposes and in which the indication circuits include the motor of the function and a common return connection, the combination with said indication circuits, of a single element alternating current relay included in said indication circuits, and means governed by said relay for interrupting said common return connection and the corresponding indication circuit.

27. In an electric interlocking system of the type in which alternating current is used for operating the functions and direct current for indication purposes and in which the indication circuits include the motor of the function and a common return connection, the combination with said indication circuits, of electromagnetic means responsive to alternating current for interrupting said return connection, and a circuit automatically established when the function is at rest and including the motor, said electromagnetic means and said return connection, whereby when alternating current is improperly supplied to the motor of the function at rest, such current will cause operation of the electromagnetic means and will automatically interrupt its path through the motor.

28. In an electric interlocking system for railroads, in combination: a source of alternating current; a function; a motor adapted to be operated by alternating current for actuating said function; control circuits for the motor; means responding to the movements of the function for controlling the connection between the control circuits and the motor, said means establishing an electrical connection to the motor in each position of the function which supplies current to the motor to move the function to its other position circuit controlling means associated with each function of the system and included in the path for the flow of current from said source to the motor of that function, said circuit controlling means when operated remaining in that condition until restored; and means operated automatically when alternating current from said open source is improperly supplied to the motor when the function is at rest for opening said circuit controlling means.

29. In an interlocking system for railroads, in combination: a source of alternating current; a function actuated by an electric motor with a single series field adapted to be operated by alternating current and capable of retaining sufficient residual magnetism in its field element to generate direct current dynamically; manually controlled means at a point distant from the function for governing the supply of current from said source to the motor; indication mechanism at the distant point; indication circuits for said mechanism including conductors extending from the distant point to the function; and means automatically controlled by the movement of the function for disconnecting said motor from the source of current and connecting it with its armature connections reversed with respect to its single field into the corresponding indication circuit, whereby the function may be operated at will from the distant point by alternating current and after each operation will send back to the distant point direct current generated dynamically for operating the indication mechanism.

30. In an electric interlocking system for railroads, in combination: a source of alternating current; a function; a motor for actuating said function and adapted to be operated by alternating current and capable of retaining sufficient residual magnetism in its field element to generate direct current dynamically; a lever at a distant point for controlling the function; control wires for the function; pole changer mechanism operated automatically in accordance with the movements of the function for reversing the connections to the armature of the motor and for alternately connecting the motor to said control wires; indication mechanism for the lever; and circuit controlling means operated by the lever for alternately connecting said control wires in circuit one with the source of current and the other with said indication mechanism whereby the function may be operated at will from the distant point by alternating current and after each operation will send back to the distant point direct current generated dynamically for operating the indication mechanism.

31. In an electric interlocking system for railroads, in combination: a source of alternating current; a function; a series compensated motor adapted to be operated by alternating current and capable of retaining sufficient residual magnetism in its field element to generate direct current dynamically; operating mechanism connecting the function and the motor and permitting free rotation of the armature of the motor by its acquired momentum at the end of each movement of the function; a lever for controlling the function; indication mechanism for the lever; and means including circuit controlling devices operated in accordance with the movement of the function and said lever for establishing an operating circuit and an indication circuit for each position of the function; the operating circuit for each position of the function including said source of current and the motor, and the indication circuit for the corresponding position of the function including the indication mechanism and the motor with its armature connections reversed.

32. In an electric interlocking system for railroads, in combination: a source of alternating current; a function; a motor adapted to be operated by alternating current and capable of retaining sufficient residual magnetism in its field element to generate direct current dynamically; operating mechanism connecting the function and the motor and permitting free rotation of the armature of the motor after each movement of the function; control wires for the function for conducting both operating and indication currents; pole changer mechanism operated in accordance with the movement of the function for connecting the motor alternately to said control wires and for reversing the connections to the armature of the motor; electromagnets for operating said pole changer mechanism; and means for including one of the electromagnets in parallel with the motor in each position of the function.

33. An interlocking system comprising a source of alternating current, a function operated by an electric motor operable on alternating current and adapted to generate direct current dynamically, indication mechanism operable by direct current but not alternating current, indication circuits for said mechanism, and means operated automatically in accordance with the movement of the function for alternately connecting the motor with its armature and field connections reversed in said indication circuits in turn at the completion of each operation of the function.

34. An interlocking system comprising a source of alternating current, a switch operating mechanism, a series motor with a single field for operating said mechanism, a lever and control circuits for governing the motor from a distant point, and an indication magnet associated with the lever and operable by direct current but not alternating current, and means for automatically connecting the indication magnet in series with the field and armature of the motor at the end of each operation of the mechanism.

35. An interlocking system comprising, in combination with a lever, indication mechanism for the lever, an indication magnet operable on direct current but not alternating current for actuating said mechanism, and a safety magnet adapted when energized to prevent operation of said mechanism by the indication magnet.

36. Indication mechanism for interlocking systems employing alternating current for operating and direct current for indication, comprising a movable armature, and an indication magnet and a safety magnet having opposing influences on said armature, the indication magnet being responsive when energized by direct current but not alternating current.

37. Indication mechanism for interlocking systems employing alternating current for operating and direct current for indication, comprising a pair of cores and a back yoke, a movable armature normally spaced at its ends from said cores with equal airgaps, an operating winding on each core, and a winding on each core included in closed circuit and disposed between the corresponding operating winding and the armature.

38. An interlocking system employing alternating current for operating and direct current for indication, comprising a source of alternating current, an electrically operable function, a lever controlling the supply of current from said source to the function, an indication circuit, and separate indication mechanism and cross protection means included in the indication circuit, the indication mechanism being operable by direct current and the cross protection means by alternating current.

39. An interlocking system employing alternating current for operating and direct current for indication, comprising in combination with an electrically operable function and an indication circuit closed when said function is at rest, separate indication and cross protection devices included in said circuit and operable only by direct current and alternating current respectively.

40. In interlocking system employing alternating current for operating and direct current for indication, comprising in combination with the indication circuits and the common return connection of the system, indication mechanism operable by direct current but not alternating current, circuit controlling means for interrupting the common return connection, and a single element alternating current relay for governing said circuit controlling means.

41. An interlocking system employing alternating current for operating and direct current for indication, comprising an electrically operable function, a source of alternating current, a lever controlling the supply of current from said source to the function, indication mechanism for the lever and an indication circuit therefor, circuit controlling means operable by alternating current but not direct current for interrupting the supply of current to the function from said source, said circuit controlling means when operated continuing in that condition until restored, and manually operable means for restoring the circuit controlling means.

42. An interlocking system employing alternating current for operating and direct current for indication, comprising a function, a source of alternating current, a return connection from the function to the source, a circuit closed when the function is at rest, electrically operable circuit controlling means for breaking the return connection when alternating current flows in said circuit, said circuit controlling means when operated continuing in operation until restored, and a manually operable restoring device for the circuit controlling means adapted when active to also break the return connection.

43. An interlocking system comprising a function, a source of alternating current, a return connection from the function to the source, a circuit closed when the function is at rest, a circuit controller in the return connection, a single element alternating current relay operating when current flows in said circuit to open the circuit controller and to hold it open until restored, and means for restoring said circuit controller adapted to prevent application of current to the function while in the restoring condition.

44. An interlocking system comprising a function, a source of alternating current, a return connection from the function to the source, a circuit closed when the function is at rest, a circuit controller in the return connection, electro-responsive means for opening the circuit controller when alternating current flows in the said circuit, means for retaining the circuit controller open, and restoring means for the circuit controller acting when operated to interrupt the return connection at another point.

45. An interlocking system comprising a function, a source of alternating current, a return connection from the function to the source, an indication circuit including in part said return connection and closed when the function is at rest, and electro-responsive means governed by the flow of alternating current in the indication circuit for breaking both the common return connection and the indication circuit.

46. In an interlocking system of the type in which alternating current is used for operating and direct current for indication, normal and reverse indication circuits closed when the function is at rest, and electro-responsive means operable by alternating current but not direct current and alternately included in said circuits for breaking the existing indication circuit.

47. In an interlocking system, a plurality of functions and circuits therefor closed when the respective functions are at rest, a source of alternating current, individual return connections from said functions to the source, and electro-responsive means in each of said circuits operable by alternating current for breaking the corresponding return connection to said source without interrupting the supply of current from said source to the other functions.

48. An interlocking system comprising a plurality of functions operable by alternating current and adapted to generate direct current dynamically after each operation, a circuit associated with each function and closed when that function is at rest, and individual cross protection devices included in the several circuits and operable upon alternating current but not direct current.

49. An interlocking system in which alternating current is used for operating and direct current for indication comprising, a lever, indication mechanism for the lever operable on direct current but not alternating current, indication circuits for said mechanism, an indication selector controlling said circuits, and a cross protection device included in the indication circuits and operated by alternating current but not direct current for preventing application of current to the function when alternating current flows in the indication circuits.

50. An interlocking system in which alternating current is used for operating and direct current for indication comprising, a lever, indication circuits having a common path, indication mechanism for the lever included in said path and operable by direct current but not alternating current, and an indication selector responsive to the flow of alternating current to the function for selectively establishing said indication circuits.

51. An interlocking system in which alternating current is used for operating and direct current for indication comprising, a function, a lever, indication mechanism for the lever including an indication magnet operable by direct current but not alternating current, a safety magnet responsive to the flow of operating current to the function for opposing the indication magnet, indication circuits for supplying current to the indication magnet, and an indication selector for selectively establishing said circuits.

JOHN C. LINDNER.